Nov. 26, 1935.    L. S. TWOMEY    2,022,165
METHOD OF SEPARATING AND PURIFYING HYDROGEN
Filed May 9, 1934    2 Sheets-Sheet 2

LEE S. TWOMEY
INVENTOR

Paul W. Guzman
ATTORNEY

Patented Nov. 26, 1935

2,022,165

UNITED STATES PATENT OFFICE 2,022,165

METHOD OF SEPARATING AND PURIFYING HYDROGEN

Lee S. Twomey, Vista, Calif.

Application May 9, 1934, Serial No. 724,695

12 Claims. (Cl. 62—175.5)

The object of my invention is to produce hydrogen of the last degree of purity from water gas or other gases in which hydrogen is present in material quantities.

The general method of operation hereinbelow described consists in first removing the carbon dioxide by solution or chemical combination, in then liquefying and separating the greatest possible proportion of other impurities, in solidifying a further portion of the impurities, and in finally liquefying the hydrogen and separating the remainder of the impurities in solid form.

Figure 1:
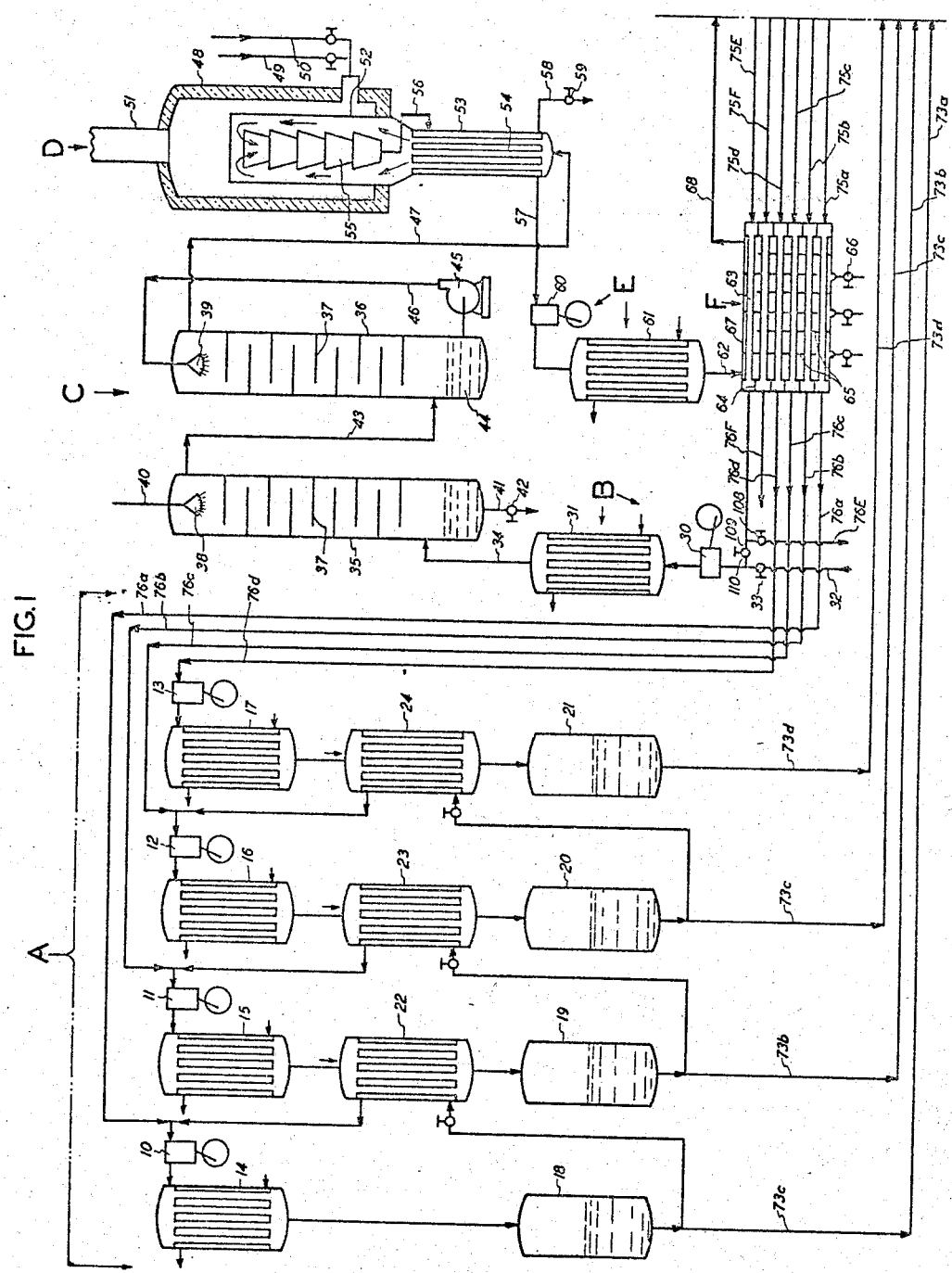
Figure 2:
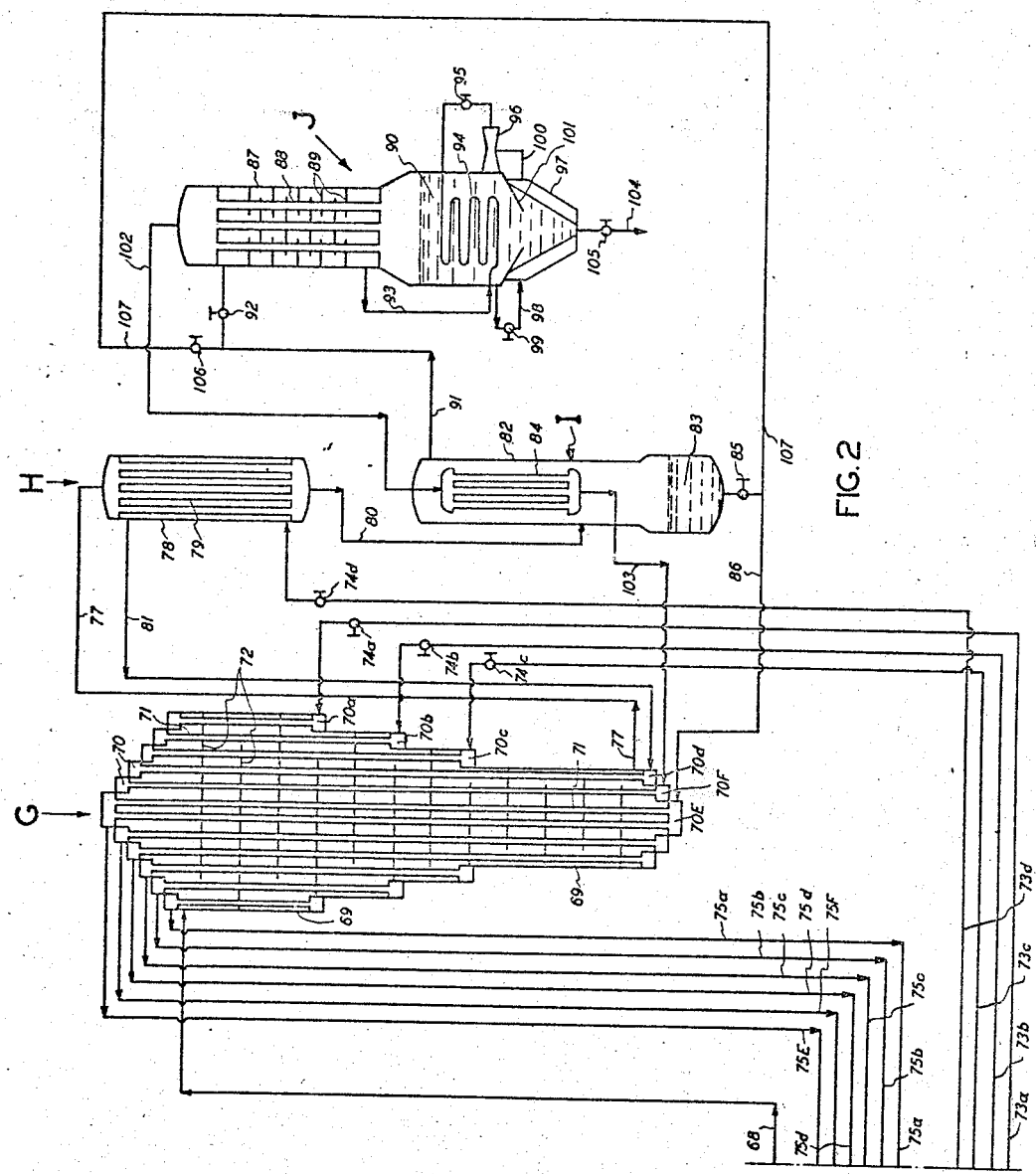

The invention may best be described in connection with the attached drawings which show in diagrammatic form an apparatus suitable for the application of the method steps of the invention. It will be understood that Figs. 1 and 2 represent a unitary assemblage of apparatus, which may be viewed as a whole by joining the right end of Fig. 1 to the left end of Fig. 2.

By way of illustration, the invention will be described in connection with the separation of pure hydrogen from a semi-water gas produced by the combustion of coke with pure oxygen in the presence of steam, and having the following analysis:

|  | Per cent |
| --- | --- |
| Hydrogen | 40.0 |
| Carbon monoxide | 32.0 |
| Carbon dioxide | 25.0 |
| Methane | 0.6 |
| Oxygen | 0.3 |
| Nitrogen | 2.1 |

The same description would apply to the separation of hydrogen from any water gas.

In order to somewhat simplify the description the apparatus shown in the drawing is divided into the following units: A is a quadruple refrigerant producing unit; B is the first stage compression unit for gas to be fractionated; C is a scrubbing unit for removing carbon dioxide; D is an apparatus for removing the last traces of oxygen from the gas; E is the second stage gas compression unit; F is a dehydrating interchanger; G is the main interchanger; H is a nitrogen cooled condenser for methane carbon monoxide and nitrogen; I is a separator for removal of these impurities both by liquefaction and by freezing, and J is a combined hydrogen liquefier and a separator of these impurities by freezing.

Unit A is substantially the apparatus for producing liquid refrigerants described and claimed in my copending application entitled "Method of producing low temperature refrigeration", Serial No. 724,691. It consists of four compressors 10, 11, 12, and 13, adapted to the compression of ammonia, ethylene, methane, and nitrogen respectively; four water cooled interchangers 14, 15, 16, and 17 in which the compressed gases are deprived of their heat of compression and brought back to substantially atmospheric temperature; four storage vessels 18, 19, 20, and 21 in which liquid ammonia, liquid ethylene, liquid methane, and liquid nitrogen are stored at pressures approximating 110 pounds, 250 pounds, 295 pounds, and 220 pounds gauge respectively and at temperatures approximating 293° K., 240° K., 168° K., and 112° K. respectively; and three condensers 22, 23, and 24 in which ethylene, methane, and nitrogen are cooled to the above temperatures and thereby condensed by the evaporation of liquid ammonia, ethylene, and methane respectively.

These four refrigerants are used in later stages of the process and while I find it highly economical and preferable to produce them in the manner above described and described at more length in the copending application, it is permissible to produce each of the refrigerants in any other manner.

Unit B comprises a compressor 30 and a water cooled interchanger 31. The raw gas enters the system from a source not shown through pipe 32 controlled by valve 33 and is compressed to a moderately high pressure, as for example 34 atm. absolute. At this pressure it is passed through interchanger 31 where it is brought back to atmospheric temperature and is then passed through pipe 34 to scrubbing unit C.

Unit C consists of two vertical shells 35 and 36 provided with baffles or trays 37 and with rose nozzles or other spraying means 38 and 39. Nozzle 38 is supplied with water from a source not shown through pipe 40 and this water, after counterflow contact with the gas passing upwardly through the shell, is withdrawn through pipe 41 controlled by valve 42. The gas, which is freed from the greater part of its carbon dioxide contact by solution in the water, passes through pipe 43 to the lower part of shell 37, in which a pool 44 of a caustic alkali solution is maintained. A stream of solution is continuously drawn from this pool by a pump 45 and directed through pipe 46 to nozzle 39, from which it passes in counterflow to the gas stream to pool 44. The gas, which is now substantially deprived of carbon dioxide, passes through pipe 47 to unit D.

Unit D comprises a furnace 48 of brick or other refractory material, supplied with fuel gas and air through pipes 49 and 50, and provided with a stack 51 for the escape of combustion products. Within this furnace is set a heating chamber 52 the wall of which is of gas tight and pressure resisting heat conducting material. This chamber is extended downwardly and out of the furnace to join the outer shell of an interchanger provided with tubes 54. Within the chamber is placed a substantially tubular member 55 consisting of a plurality of truncated cones tapering downwardly, the bottom edge of one cone being joined to the top edge of the one next below by a ring of sheet metal. These cones are filled with copper in the form of fine wire, shavings or turnings, the purpose of the conical form being to prevent leakage of gas around the edges of the mass of finely divided copper as this mass shrinks under continued heating.

As shown by the directional arrows, the gas from the scrubbing unit enters the lower end of interchanger 53, passes upwardly through tubes 54 and around the tubular member 55, being heated to a desired temperature (about 450° C.) by contact with the walls of chamber 52. It then passes into the upper end of member 55 and downwardly through the masses of heated copper, which cause complete combustion with hydrogen of whatever oxygen the gas may contain, and passes through a pipe 56 to the upper end of the space surrounding the tubes of interchanger 53, and flowing downwardly through this space is cooled in heating the upflowing gas within the tubes, finally passing at substantially atmospheric temperature and under approximately 34 atm. pressure to unit E through pipe 57. A drain 58 having a valve 59 is provided for removing water which condenses in this interchanger.

Unit E comprises a compressor 60, which for economy of power is preferable multistage, and a water cooled interchanger 61. The gas entering the compressor through pipe 57 is raised to a relatively high pressure, as for example 245 atm. absolute. At this pressure it is passed through interchanger 61 where it is brought back to atmospheric temperature and is then passed through pipe 62 to the dehydrating interchanger F.

The dehydrating interchanger F is provided with a multiplicity of tubes 63 which are divided into groups by means of partitions 64 across the end tube chambers, and through these tube groups are individually conveyed various gases returning from later steps on the operation, as will be described. The space around the tubes is a common chamber which may be provided with the baffles indicated at 65 and with drain valves 66 for withdrawing condensed water from the pockets so formed. The temperature of this interchanger is so controlled that the gas leaving shell 67 and passing through pipe 68 to unit G is substantially deprived of water. As this water is partly separated in the liquid form and partly as ice which accumulates in the interchanger, it is desirable to provide this unit in duplicate.

The main interchanger G has a shell 69 of the stepped construction shown and is provided with annular tube chambers 70—70 arranged to divide the tubes 71—71 into groups of different lengths. The interior of the shell is a common chamber through which all the tubes pass, but is preferably provided with baffles 72 by which the gas flowing through the shell is repeatedly contacted with the tubes at an obtuse angle and under conditions of extreme turbulence. By this means the temperature within all the tubes at any one level is equalized and a very great temperature difference between the two ends of the interchanger is made possible.

The outermost tube chamber 70a is supplied with liquid anhydrous ammonia withdrawn from storage vessel 18 through pipe 73a. An expansion valve 74a reduces the pressure on the ammonia to substantially atmospheric, the ammonia vaporizing at the valve and in the tubes at its atmosphere pressure boiling point or about 240° K. Passing upwardly through the tubes, the ammonia flows through pipe 75a to a tube group of interchanger F, leaves these tubes at substantially atmospheric temperature and pressure, and returns through pipe 76a to the suction of ammonia compressor 10 for recompression and condensation.

The next lower tube chamber 70b is supplied with liquid ethylene withdrawn from storage vessel 19 through pipe 73b. An expansion valve 74b reduces the pressure on the ethylene to substantially atmospheric, whereupon it vaporizes as above described at a temperature about 168° K., flows through pipe 75b to and through interchanger F, and passes through pipe 76b at substantially atmospheric temperature and pressure to the suction of ethylene compressor 11.

The next lower tube chamber 70c is supplied with liquid methane withdrawn from storage vessel 20 through pipe 73c. An expansion valve 74c reduces the pressure on the methane to substantially atmospheric, whereupon it vaporizes as above described at a temperature about 112° K., flows through pipe 75c to and through interchanger F and passes through pipe 76c at substantially atmospheric temperature and pressure to the suction of methane compressor 12.

The remaining tube chambers and their corresponding tube groups are supplied with cold gases returning from later steps in the operation, as will be described.

While a high degree of power economy is attainable by the storage refrigeration above described, it should be understood that the same final result as to purity may be attained and the apparatus simplified by omitting the three tube groups supplied with ammonia, ethylene, and methane respectively, together with the corresponding passes through dehydrating interchanger F, and correspondingly increasing the supply of liquid nitrogen to interchanger H.

If step refrigeration is used, the temperature of the cold end of the dehydrating interchanger F may be controlled by use of the highest boiling refrigerant used in main interchanger G. The effectiveness of dehydrating interchanger F in reducing the amount of water vapor in the gas leaving it may be increased by the omission of the ammonia step from main interchanger G, but this omission introduces the disadvantage of having lower temperatures with which to deal when periodically alternating the duplicate dehydrating interchanger. The question of the omission of the ammonia step or even the ethylene step is thus solely a matter of preference.

The stream of gas, which has been considerably lowered in temperature in passing through the main interchanger, passes through pipe 77 to nitrogen refrigerator H which comprises a shell 78 provided with tubes 79. The space around the tubes is supplied with liquid nitrogen withdrawn from storage vessel 21 through pipe 73d. An expansion valve 74d reduces the pressure on the nitrogen to 3.5 atm., whereupon it vaporizes at a temperature about 90° K. in withdrawing heat from the partially purified hydrogen. The vaporized nitrogen passes from condenser H through pipe 81 to tube chamber 70d of interchanger G, thence through pipe 75d to and through interchanger F, and thence through pipe 76d to the suction of nitrogen compressor 13.

Unit I has a shell 82 of which the lower portion acts as a storage vessel for a pool of condensate 83. In the upper portion of the shell is placed a tube bank 84 through which is passed cold hydrogen gas returning from unit J. The top of the shell is maintained by this tube bank at a temperature which should not be above 63° K. nor below 52° K., for reasons which will appear.

In condenser H, methane, carbon monoxide, and nitrogen present in the gas stream are partially condensed out, the liquid condensate draining into pool 83 in unit I, and the lower portion of tube bank 84 also produces some condensate which drains into the same pool. The liquid collected in this pool, which is a mixture of methane, carbon monoxide, and nitrogen in more or less the same relative proportions as those in which they occur in the gas, is passed through an expansion valve 85 by which it is reduced to substantially atmospheric pressure, thence through pipe 86 to tube chamber 70e of interchanger G, thence through pipe 75e to and through interchanger F, and finally is discharged from the system through pipe 76e and open valve 103 as a fuel gas at substantially atmospheric temperature and pressure.

The upper portion of tube bank 84 in unit I is colder than the lower portion and acts as a freezer for methane, carbon monoxide, and nitrogen, the solids thus formed being largely collected as ice on the tubes while a smaller portion (depending to some extent on gas velocity through the apparatus) may be carried forward as snow into unit J.

Unit J comprises in its upper portion a shell 87, a plurality of tubes 88, and of baffles 89, the whole forming an interchanger. The lower portion of the shell provides storage space for a pool of liquid hydrogen 90.

The gas leaving unit I passes through pipe 91 and an open valve 92 into the shell of unit J, where it is cooled in countercurrent to the cold expanded hydrogen passing through the tubes. The space around the tubes is designed to afford storage for considerable accumulations of snow, to minimize the frequency of shut-downs for thawing. The gas then passes through pipe 93 and a boiling coil 94, immersed in hydrogen pool 90, to an expansion valve 95 and an aspirator 96 by which, in cooperation, it is reduced from its initial pressure of 245 atm. to a pressure slightly in excess of atmospheric. Under the initial pressure the gas is liquefied in the boiling coil and by expansion is reduced in temperature to 20° K., being then introduced, mainly in the liquid condition, into hydrogen pool 90 which is in constant ebullition at approximately 20.5° K.

The lower end of the shell is surrounded by a jacket 97 which is constantly supplied with a small quantity of liquid hydrogen through pipe 98 and valve 99. This jacket is in communication with the suction side of aspirator 96 through pipe 100 and the small pressure difference created by the aspirator slightly lowers the boiling point of the liquid hydrogen in the jacket, and the heat leaking into the jacket is consumed in boiling the jacket hydrogen and is thus prevented from reaching the lower end of pool 90, which it is deried to maintain in a quiescent state. A conical inward projection 101 or a projection of cove section so directs convection curents that floating crystals may be deflected to the center of the pool where they will more readily sink to the bottom of the cone.

The hydrogen gas produced by the boiling of the upper portion of pool 90 passes upwardly through tubes 88 where it cools the gas passing downwardly through the shell, thence through pipe 102 to tube bank 84 of unit I, thence through pipe 103 to tube chamber 70f of interchanger G, thence through pipe 75f to and through interchanger F, and is finally withdrawn from the system through pipe 76f as hydrogen in the last degree of purity.

The objects of the above described manipulations following the step of oxygen removal are: first, to liquefy and to separate as a liquid the largest possible proportion of the impurities (methane, carbon monoxide, and nitrogen), separation in the liquid form being less troublesome and costly than the separation of solids; second, to attain the highest possible degree of purification by freezing and separating in the solid form the largest possible proportion of the impurities remaining after the liquid separation step.

The minimum temperature at which these impurities may be removed in liquid form in the apparatus shown is limited by the temperature at which the mixture of impurities begins to solidify, as for reasonable operating convenience it is desirable to confine the accumulation of solids to certain specific vessels (units I and J) designed for the ready removal of ice. Therefore, in order to prevent the solidification of methane in unit H the outlet temperature of this unit is maintained at 90° K. or 2° above the freezing point of methane.

The temperature at the top of unit I may be varied within limits without greatly affecting the final result. This temperature should not be below about 52° K. as at lower temperatures the heat supplied to the boiling coil will be insufficient to revaporize the liquid hydrogen. On the other hand it should not be higher than about 63° K. as otherwise an excessive proportion of the total carbon monoxide and nitrogen will be carried over into unit J. The actual temperature realized in practice will depend on the proportioning of the area of tube bank 84 to the total area of tubes 88.

The temperature of hydrogen pool 90 is self maintaining at that of boiling liquid hydrogen or about 20.5° K.

The effect of the above steps and temperatures is to produce a tail gas out of the various units having the following proportions of impurities. In each of the columns except the first, which states the percentage analysis of the original gas, the figures represent the number of volumes of the stated impurity accompanying 100 volumes of pure hydrogen at the stage recited, up to the point where the original quantity of hydrogen is reduced by combination with oxygen.

Original gas

| | | |
|---|---:|---|
| Hydrogen | 40.0% | 100.00 Volumes |
| Carbon dioxide | 25.0% | 62.50 do |
| Oxygen | 0.3% | 0.75 do |
| Methane | 0.6% | 1.50 do |
| Carbon monoxide | 32.0% | 80.00 do |
| Nitrogen | 2.1% | 5.25 do |
| Total quantity | | 250.00 do |
| Purity of hydrogen | | 40.00% |

After scrubbing in unit C

| | |
|---|---|
| Hydrogen | 100.00 Volumes |
| Oxygen | 0.75 do |
| Methane | 1.50 do |
| Carbon monoxide | 80.00 do |
| Nitrogen | 5.25 do |
| Total quantity | 187.50 do |
| Purity of hydrogen | 53.33% |

*After removal of oxygen of unit D*

| | | |
|---|---:|---|
| Hydrogen | 98.50 | Volumes |
| Methane | 1.50 | do |
| Carbon monoxide | 80.00 | do |
| Nitrogen | 5.25 | do |
| Total quantity | 185.25 | do |
| Purity of hydrogen | 53.12% | |

*Out of unit H at 90° K.—gas phase*

| | | |
|---|---:|---|
| Hydrogen | 98.500 | Volumes |
| Methane | 0.042 | do |
| Carbon monoxide | 1.002 | do |
| Nitrogen | 1.445 | do |
| Total quantity | 100.989 | do |
| Purity of hydrogen | 97.528% | |

| Out of unit I at | 63° K. | 52° K. |
|---|---|---|
| Hydrogen | 98.500 vol. | 98.50000 vol. |
| Methane | .0004 do. | .00010 do. |
| Carbon monoxide | .0204 do. | .00204 do. |
| Nitrogen | .0531 do. | .00531 do. |
| Total quantity | 98.57 do. | 98.50745 do. |
| Purity of hydrogen | 99.925% | 99.992% |

*Out of unit J at 20.5° K.*

| | | |
|---|---:|---|
| Hydrogen | 98.50000 | Volumes |
| Carbon monoxide | .00004 | do |
| Nitrogen | .00008 | do |
| Total quantity | 98.50012 | do |
| Purity of hydrogen | 99.999% | |

The figures above stated for methane at 63° and 52° and for carbon monoxide and nitrogen at 20.5° are not represented to be accurate, being based on straight line projections of vapor pressure curves terminating at 73° for methane, 52° for carbon monoxide and 57° for nitrogen. So far as I am aware, vapor pressure determinations at lower temperatures have not been made public, and these extremely small proportions of gaseous impurities are beyond the limits of accuracy of chemical analysis. The figures are, however, sufficiently close to the truth to indicate an undeterminable but extremely minute proportion of impurity in hydrogen reduced to a temperature of 20.5° K. when provision is made for the physical separation of all substances liquefied or solidified at that temperature.

The structure of unit I is such that the gas is cooled from 90° down to the preferred outlet temperature in flowing over the tube bank 84 rather than by contact with the wall of the shell. Part of the impurities frozen out by temperature reduction in this stage passes forward to unit J in the form of snow suspended in the gas stream, but the portion which remains behind in unit I is in the form of ice or frost of the tubes themselves instead of on the shell wall, a fact which greatly aids the rapidity with which the ice accumulation may be removed by thawing.

On passing through the shell of unit J any snow crystals are deposited, while further crystals formed in the boiling coil are discharged with the liquid, in which their volumetric proportion is almost inappreciable, and are retained in the hydrogen pool in which their superior specific gravity causes their rapid subsidence and their concentration in the quiescent zone in the bottom of this pool. These crystals may be withdrawn at intervals by venting small quantities of liquid hydrogen through pipe 104 and valve 105. The hydrostatic head of the liquid hydrogen materially retards the evolution of contaminating vapors from the crystals.

As will be evident from the figures given above, the major portion (over 97%) of the impurities remaining in the gaseous form at 90° K. are frozen even at 63° K. and the ice thus formed collects mainly in unit I, which will therefore require thawing at intervals varying with the ice storage capacity of this unit. The thawing may be accomplished by closing valves 92 and 85 and partially opening a valve 106 in pipe 107, this pipe connecting with pipe 86 and in turn with pipes 75e and 76e, through the latter of which the liquefied impurities condensing in unit I are normally discharged. For the purpose of setting up a thawing cycle, pipe 76e is provided with a valve 108 and a branch 109 with a valve 110. While operating, valve 108 is open and valve 110 closed, but when thawing this order is reversed, admitting the thawing gas to the suction of compressor 30 by which it is delivered through the series of units from C to I inclusive. Valve 33 in raw gas inlet pipe 32 should be closed while thawing, and also valve 74d by which the nitrogen supply is withdrawn from unit H and the cycled gas allowed to warm up until the tube bank is completely defrosted.

When this step is completed, valve 74d is opened to restore nitrogen refrigeration and circulation is continued until the temperature of the gas passing through pipe 80 is again reduced to 90° K., at which time the other valve changes above described are reversed and the apparatus thereby put back on production.

I claim as my invention:

1. The method of separating and purifying hydrogen from a gaseous mixture consisting of hydrogen and gaseous impurities of higher boiling point which comprises: compressing a stream of said gaseous mixture to approximately 245 atm. absolute; cooling said stream to a temperature of substantial dehydration; further cooling said stream to approximately 90° K. and condensing a portion of the impurities; further cooling said stream to a temperature not substantially above 63° K. and thereby forming a further quantity of condensate and freezing a portion of said impurities; removing both said condensates; further cooling said stream under pressure to substantially 30° K. whereby the hydrogen is liquefied and substantially all remaining impurities are solidified as crystals; releasing the presssure on said hydrogen and thereby reducing its temperature to substantially 20° K.; collecting a body of said liquid hydrogen; maintaining the lower part of said body in a state of quiescence; maintaining the upper part of said body in ebullition, and withdrawing substantially pure gaseous hydrogen from above said body.

2. The method of separating and purifying hydrogen from a gaseous mixture consisting of hydrogen and gaseous impurities of higher boiling point, which comprises: compressing a stream of said gaseous mixture to a high superatmospheric pressure; cooling said stream to a temperature of substantial dehydration; further cooling said stream to a temperature of condensation of a portion of the impurities; further cooling said stream to a temperature at which further quantities of said impurities are condensed and a portion of said impurities are frozen; removing both said condensates; further cooling said stream under pressure to a temperature at which the hydrogen is liquefied and substantially all remaining impurities are solidified as crystals; reducing the pressure on said hydrogen and thereby reducing its temperature to the boiling point of hydrogen at said reduced pressure; collecting a body of said liquefied hydrogen; maintaining the lower part of said body in a state of quiescence; maintaining the upper part of said body in a state of ebullition, and withdrawing substantially pure gaseous hydrogen from above said body.

3. The method of removing a gaseous impurity from substantially water-free hydrogen which comprises: cooling a stream of said hydrogen to a temperature not above the freezing point of said impurity; retarding the flow of said stream to permit the deposition of solid particles of said impurity, and withdrawing said stream from said deposited particles.

4. The method of removing impurities from a stream of hydrogen which comprises: liquefying said hydrogen and freezing said impurities; collecting said liquefied hydrogen in a pool and sedimenting solidified particles into the lower part of said pool, and evaporating purified hydrogen from the upper part of said pool.

5. A method substantially as and for the purpose set forth in claim 4, including the step of maintaining the lower part of said pool in a state of relative quiescence by evaporating a relatively small proportion of liquid hydrogen withdrawn from said pool in heat interchange relationship with said lower part of said pool.

6. The method of removing impurities from a stream of hydrogen which comprises: liquefying said hydrogen; forming solid particles of frozen impurities within said hydrogen stream, and separating said solid particles from said hydrogen by evaporating said hydrogen within an enclosure of space in which said solid particles are retained.

7. The method of removing a gaseous impurity from substantially water-free hydrogen which comprises: cooling a stream of said hydrogen to a temperature at which a portion of said impurity is frozen and retarding the flow of said stream to permit the deposition of solid particles of said impurity; withdrawing said stream from said deposited solid particles; liquefying said hydrogen at a reduced temperature and thereby producing further solid particles of said impurity within said liquefied hydrogen.

8. In an operation in which a residue of hydrogen is separated from a stream of mixed gases containing higher boiling impurities by compression and cooling of said stream, the steps comprising: cooling said stream under pressure from substantially atmospheric temperature in six stages, to-wit: in the first and warmest stage, by heat interchange with expanded and evaporating liquid anhydrous ammonia; in the second stage by heat interchange with expanded and evaporating liquid ethylene; in the third stage by heat interchange with expanded and evaporating liquid methane; in the fourth stage by heat interchange with an expanded and evaporating condensate of impurities formed and separated in succeeding stages; in the fifth stage by heat interchange with expanded and evaporating liquid nitrogen, and in the sixth and coldest stage by heat interchange with hydrogen cooled in the preceding stages and further cooled by expansion; the gases produced by expansion and evaporation in each said stage being returned in heat exchange relation with said stream under pressure through all preceding stages.

9. Steps substantially as and for the purpose set forth in claim 8, in which streams of the gaseous ammonia, ethylene, methane, and nitrogen produced by evaporation and expansion are separately compressed, cooled, and liquefied to provide the respective liquids for the first, second, third, and fifth cooling stages.

10. Steps substantially as and for the purpose set forth in claim 8, in which streams of the gaseous ammonia, ethylene, methane, and nitrogen produced by evaporation and expansion are heated to substantially atmospheric temperature in effecting a preliminary cooling of said mixed gas stream to a temperature of dehydration and are thereafter separately compressed, cooled and liquefied to provide the respective liquids for the first, second, third, and fifth cooling stages.

11. The method of removing a gaseous impurity from substantially water-free hydrogen which comprises: cooling a stream of said hydrogen to a temperature at which a portion of said impurity is frozen and retarding the flow of said stream to permit the deposition of solid particles of said impurity; withdrawing said stream from said deposited solid particles; liquefying said hydrogen and entraining in said liquid any solid particles of said impurity not previously deposited.

12. The method of effecting a partial separation of nitrogen and carbon monoxide from admixture with hydrogen which comprises: liquefying streams of gaseous ammonia, ethylene, methane, and nitrogen by compression and cooling; applying the expansion and evaporation of liquid streams of said ammonia, ethylene, and methane to the respective final cooling and liquefaction of said gaseous streams of ethylene, methane, and nitrogen; compressing a stream of said admixture and substantially removing carbon dioxide and water therefrom; reducing said mixture stream in a first cooling effect to a temperature at which carbon monoxide and nitrogen begin to condense; reducing said mixture in a second cooling effect to a lower temperature, thereby producing a condensate of nitrogen and carbon monoxide and a stream of purified hydrogen; separating said condensate from said stream; expanding said hydrogen stream to substantially atmospheric pressure; producing said first cooling effect by heat interchange between said mixture stream and a plurality of colder gas streams returned from later steps in the process and also by heat interchange between said mixture stream and an expanded and evaporating stream of at least one of said liquid refrigerants; returning the gaseous methane so produced to be recompressed; producing said second cooling effect by heat interchange between said mixture stream and cooling media including said expanded hydrogen stream and an expanded and evaporating stream of said liquid nitrogen; passing the hydrogen and nitrogen discharged from said second cooling effect in heat interchange relation with said mixture stream in first said cooling effect, whereby said hydrogen and nitrogen are brought to substantially atmospheric temperature; withdrawing said expanded hydrogen stream, and returning last said nitrogen stream for recompression.

LEE S. TWOMEY.